B. F. STONER.
GAGE.
No. 190,260. Patented May 1, 1877.
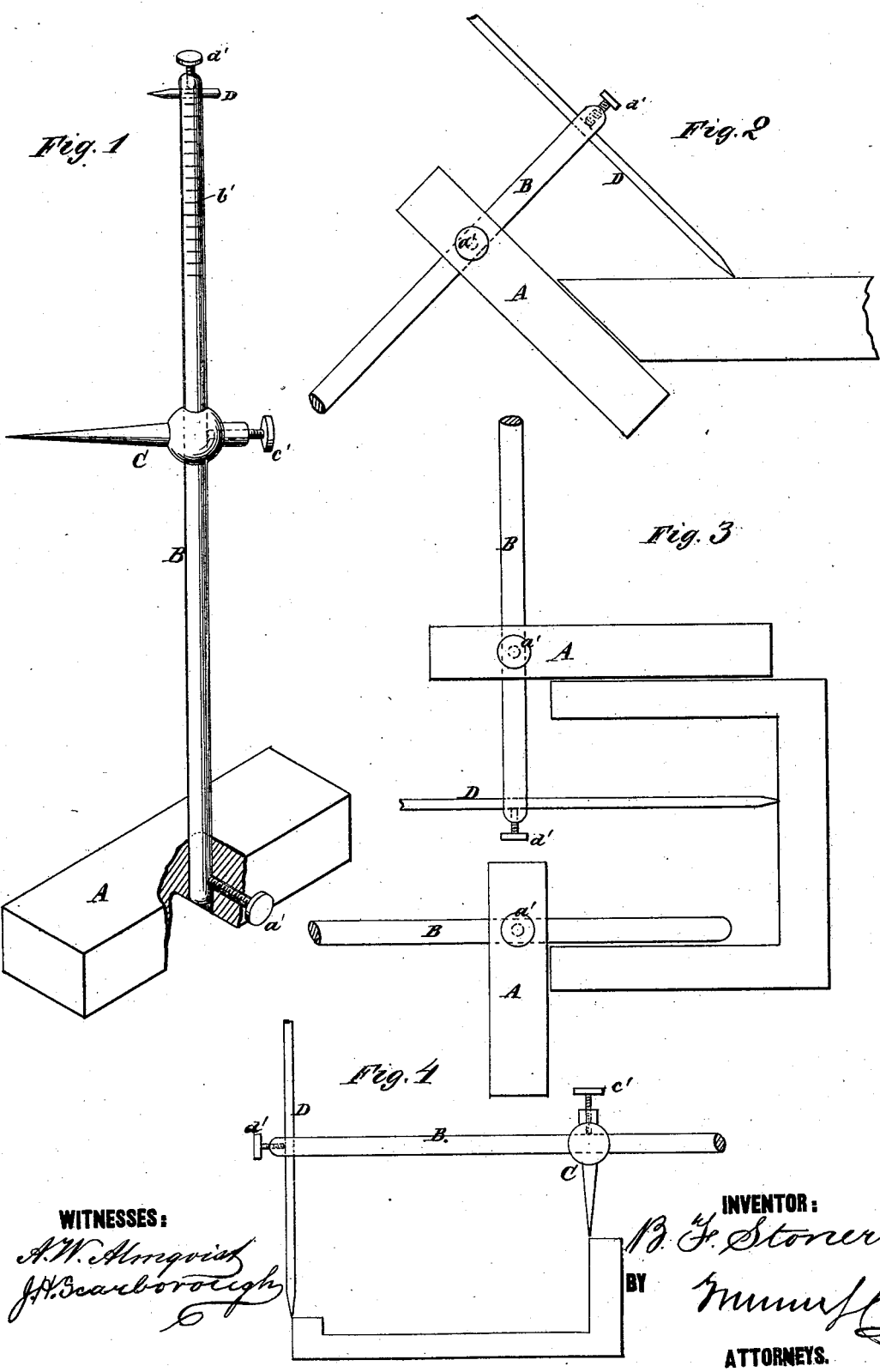

UNITED STATES PATENT OFFICE.

BENJAMIN F. STONER, OF ROCKFORD, ILLINOIS.

IMPROVEMENT IN GAGES.

Specification forming part of Letters Patent No. 190,260, dated May 1, 1877; application filed January 29, 1877.

*To all whom it may concern:*

Be it known that I, BENJAMIN F. STONER, of Rockford, in the county of Winnebago and State of Illinois, have invented a new and useful Improvement in Combined Gage, Try-Square, and Trammel, of which the following is a specification:

Figure 1 is a perspective view of my improved instrument, part being broken away to show the construction. Figs. 2, 3, and 4 are views illustrating its use.

Similar letters of reference indicate corresponding parts.

The object of this invention is to furnish an improved instrument, which may be used as a gage for all irregular surfaces, and for work which an ordinary gage cannot reach, which may be used as a marking-gage, as a try-square, and as a trammel, and which shall be simple in construction and convenient in use, being easily adjusted as the purpose for which it is to be used may require.

The invention will first be described in connection with the drawing, and then pointed out in the claim.

A represents the head, which is rectangular in form, and may be plated with metal to prevent wear. Through the head A is formed a hole, which may be bushed with metal to prevent wear, to receive the rod B. The rod B is secured in place adjustably by a set-screw, $a'$.

C is the pivot-finger of the trammel, which is made with a globe-socket upon its base to receive the rod B, and is secured adjustably upon said rod by a set-screw, $c'$.

D is the marking-needle, which is passed through a hole in the rod B, near its outer end, and is secured in place adjustably by a set-screw, $d'$, passing in through the end of the said rod B.

The needle D may be made short, as shown in Fig. 1, for convenience in using the instrument as an ordinary marking-gage, or long, as shown in Figs. 2, 3, and 4, to adapt it for use for gaging irregular surfaces, and for use as a trammel.

Upon the rod B is formed a scale, $b'$, of division-marks. When the instrument is to be used as a square, the rod B can be adjusted to any desired length, and can be used where the blade of an ordinary square would render it inconvenient to use it, or prevent its use.

Having thus described my invention, I claim as new and desire to secure by Letters Patent—

An instrument consisting of head A, notated rod B, adjustable in said head, and the adjustable fingers C D, substantially as shown and described.

BENJAMIN F. STONER.

Witnesses:
FAY E. ROBERTS,
PAUL F. SCHUSTER.